Patented Aug. 31, 1954

2,687,969

UNITED STATES PATENT OFFICE 2,687,969

METHOD FOR PRODUCING METALLURGICAL CEMENT

Victor Trief, Deux Acren, Belgium

No Drawing. Application July 18, 1950,
Serial No. 174,573

Claims priority, application Belgium July 20, 1949

5 Claims. (Cl. 106—117)

This invention relates to the production of cementitious material and like binder.

It is known to prepare a binder, from granulated blast-furnace slag which is subjected to wet-grinding, so as to yield a paste containing as a rule 25 to 30% of water, such grinding being performed in the absence of a catalyst capable to bring about the setting of the binder.

It has already been suggested to dry such paste before it may get deteriorated, so as to obtain a fine powder having high but latent hydraulic properties, which latter will not come into effect unless a suitable catalyst (e. g. Portland cement, soda or another suitable basic substance) has been added. Such drying of the paste may be carried out e. g. in two stages: first by removing a portion of the water contained in the paste by decanting, centrifugal drying or like methods, and then by submitting such paste to a complementary drying action by supplying heat thereto.

This known method yields excellent results as far as the quality of the cement thus obtained is concerned; the drying of the paste, however, gives rise to certain drawbacks, and should the latter be eliminated, the method could be still more economical.

In fact, the drying still requires an appreciable consumption of calories, since, despite a prior extraction of a portion of the water by centrifugal drying or like action, a substantial amount of water, e. g. of the order of 15 to 20%, still remains in the paste, which water has to be removed by heat. Moreover, when the drying is effected by means of a hot air stream, a large amount of the fine particles is unavoidably swept away through the chimney, this being a very important drawback which cannot be completely eliminated by smoke cleaning means, which are rather expensive. Moreover, in the known devices, the drying of the paste must be effected rapidly, the storage of the paste being practically impossible.

This invention relates to a method which makes it possible to eliminate all the above drawbacks and to carry out the drying of the slag paste in a particularly practical and economical way. The invention is based upon the fact which has now been found, viz., that, once sufficient water has been removed from the paste to impart to the latter the consistency required for moulding said paste into bricks or the like, the latter may be dried slowly even in the open air, without the slightest deterioration, and that, even after a long period of storage, such bricks may be conveniently crushed to powder so as to yield a cement in powder form which will still retain its high latent hydraulic properties and which only requires the addition of a suitable catalyst to make it proper for setting.

Consequently, the method according to this invention is essentially characterized by the fact that, after the paste has been prepared by wet grinding the slag, the water contents of the said paste are being sufficiently lowered, e. g. by removing the water in excess of about 20%, in order to obtain a thick paste capable of being moulded, that bricks or like articles are formed from the said thick paste, and that the said bricks or the like are left to dry until their water contents have been lowered e. g. to about 5% or even less, whereupon crushing of the bricks or the like may be effected at any desired moment or time.

The partial removal of the water from the paste may be effected by any suitable means, advantageously by centrifugal drying under vacuum.

The water contents of the initial paste may also be lowered by adding thereto a suitable proportion of powder which had been previously prepared by drying a slag paste. Preferably, use is made to this end of the powder obtained according to the method of this invention, which makes it possible to set up a continuous manufacturing method without any centrifugal drying plant or the like. For instance, in order that the 27.5% water content of a paste be reduced to 20%, it is only necessary to mix 2 tons of such paste with one ton of powder containing 5% of water.

The thick paste may be moulded to any shape, but preferably in the form of articles suitable for stacking, e. g. of parallelepipedic bricks, so that they may be arranged in stacks in chequer pattern, which will be convenient for an easy drying in the open air. It will be understood that the paste may also be moulded into articles of a shape not suited for stacking, and which will then have to be dried in heaps on perforated beds clear above the soil, so as to facilitate the circulation of air. In the appending claims, the term "bricklike articles" will be used for generally designating articles having any of the above mentioned forms. The drying in the open air has the advantage that it does not require any supply of heat, while making it possible to lower the water contents to as low as about 5% or even less. It will be seen that the drying can also be performed by placing the moulded articles in an enclosure having air circulated therethrough, which air may be heated if desired.

The said bricks or like articles may be crushed to yield cement in powder form, but they may also be conveyed in bulk, and the vehicles may be loaded and unloaded by mechanical means, whereby the handling cost will be reduced. The crushing of the bricks or the like is carried out very easily since the mass is of low cohesion and this crushing operation can conveniently be performed on the spot where the cement is used, by means of any crushing device.

According to the invention, the paste may also have added thereto a certain amount of sand, grit or like material, so that it will merely be necessary to crush the articles moulded from the paste to powder and to add thereafter a catalyst and water to the latter, in order to directly obtain concrete mortar. The said amount will be determined according to normal practice, for each special kind of mortar.

The crushing may be effected either by the dry or the wet method, in the presence of a catalyst if desired; however, in both instances, the catalyst may be added after crushing. Thus, e. g. the crushing may be effected in a solution of soda in water, there being used, for instance, about 1 to 1½% of soda and about 30 to 50% of water relative to the cement.

The moulding of the articles from the thick paste may be effected in any way. One practical method of moulding in brick form is by means of an extruding machine of general use in brickmaking.

It will be seen that the method of the invention can be carried out in a particularly simple and economic way, since it may be performed without the consumption of caloric energy. Moreover, the material will not deteriorate and will retain all its hydraulic properties since it remains substantially unadulterated being devoid of the addition of a catalytic substance, such as soda, Portland cement, etc.

Accordingly, there has been provided a method of producing a cementitious material having high latent hydraulic binding properties and suitable for use as cement after the addition of a catalytic substance to bring about setting, including the steps of finely wet grinding granulated slag to cement fineness thereby forming a liquid paste, adding a particulate filler in an amount sufficient to reduce the water content of the paste to about 20% so as to obtain a relatively thick paste capable of being moulded, forming the said thick paste into bricklike articles, and drying the latter until the water content is at a maximum of 5% so as to obtain stable dry bricklike articles of low cohesion which are readily crushable to fine powder.

Finally, the losses of material are eliminated since, particularly, losses by drag across the chimney are out of question, which losses in addition to being prejudicial to the economy of the method, also were a nuisance for the vicinity of the plant.

It will be understood that the invention is not limited to the specific examples described, but may be carried out in numerous different ways without departing from the spirit of the said invention.

Having thus described the invention, what is claimed as new and desired to be secured by Letters Patent, is:

1. The method of producing a cementitious material having high latent hydraulic binding properties and suitable for use as cement after the addition of a catalytic substance to bring about setting, including the steps of finely wet grinding granulated slag to cement fineness thereby forming a liquid paste, adding a particulate inert filler in an amount sufficient to reduce the water content of the paste to about 20% so as to obtain a relatively thick paste capable of being moulded, forming the said thick paste into bricklike articles, and drying the latter until the water content is at a maximum of 5% so as to obtain stable dry bricklike articles of low cohesion which are readily crushable to fine powder.

2. The method according to claim 1, wherein said particulate inert filler comprises dry blast furnace slag of fine particle size.

3. The method according to claim 1, wherein said particulate inert filler comprises sand.

4. The method according to claim 1, including the further step of finally crushing said molded articles to powder in a solution of soda in water comprising about 1 to 1½% of soda and about 30% to 50% of water relative to the cement.

5. The method of producing a cementitious material having high latent hydraulic binding properties and suitable for use as cement after the addition of a catalytic substance to bring about setting, including the steps of wet grinding granulated slag to the final cement fineness thereby forming a liquid paste, adding a particulate inert dry material in an amount sufficient to reduce the water content of the paste to about 20% so as to obtain a relatively thick paste capable of being moulded, forming the said thick paste into bricklike articles, drying the latter until the water content is at a maximum of 5% so as to obtain stable dry bricklike articles of low cohesion which are readily crushable to dry powder, and crushing said dry bricklike articles to fine powder, part of such powder being used as the said particulate inert dry material.

References Cited in the file of this patent

UNITED STATES PATENTS

| Number | Name | Date |
| --- | --- | --- |
| 1,462,991 | Taylor | July 24, 1923 |
| 1,633,132 | Schoenhoefer | June 21, 1927 |
| 2,362,060 | Etridge | Nov. 7, 1944 |
| 2,632,711 | Trief | Mar. 24, 1953 |

FOREIGN PATENTS

| Number | Country | Date |
| --- | --- | --- |
| 114,794 | Great Britain | 1918 |
| 347,357 | Great Britain | 1931 |